US012231845B2

(12) United States Patent
Kawaguchi et al.

(10) Patent No.: US 12,231,845 B2
(45) Date of Patent: Feb. 18, 2025

(54) VIRTUAL SPACE CONNECTION DEVICE

(71) Applicant: tonari KK, Tokyo (JP)

(72) Inventors: Ryo Kawaguchi, Tokyo (JP); Taj Campbell, Tokyo (JP); Allen Jacob McGinty, Tokyo (JP); Brian Schwind, Tokyo (JP); Andrea Law, Tokyo (JP); Alvaro Arregui Falcon, Tokyo (JP); Alisaun Fukugaki, Tokyo (JP); Shiro Gonoo, Tokyo (JP)

(73) Assignee: tonari KK, Tokyo (JP)

( * ) Notice: Subject to any disclaimer, the term of this patent is extended or adjusted under 35 U.S.C. 154(b) by 138 days.

(21) Appl. No.: 17/997,305

(22) PCT Filed: Mar. 22, 2021

(86) PCT No.: PCT/JP2021/011790
§ 371 (c)(1),
(2) Date: Oct. 27, 2022

(87) PCT Pub. No.: WO2021/220665
PCT Pub. Date: Nov. 4, 2021

(65) Prior Publication Data
US 2023/0199380 A1    Jun. 22, 2023

(30) Foreign Application Priority Data
May 1, 2020   (JP) .................. 2020-081110

(51) Int. Cl.
*H04R 1/40*   (2006.01)
*G06T 7/70*   (2017.01)
*G06V 10/60*   (2022.01)

(52) U.S. Cl.
CPC .............. *H04R 1/406* (2013.01); *G06T 7/70* (2017.01); *G06V 10/60* (2022.01)

(58) Field of Classification Search
CPC .......... H04R 1/406; G06T 7/70; G06V 10/60
See application file for complete search history.

(56) References Cited

U.S. PATENT DOCUMENTS

2001/0040963 A1\* 11/2001 Thomasson ........... H04M 9/087
                                                         379/416
2002/0159603 A1   10/2002 Hirai et al.
(Continued)

FOREIGN PATENT DOCUMENTS

CN    108293104 A      7/2018
JP    2004056161 A  \*  2/2004
(Continued)

OTHER PUBLICATIONS

English machine translation of JP-2004056161-A (Obayashi et al.; Multimedia Communication System ; published Feb. 2004) (Year: 2004).\*

(Continued)

*Primary Examiner* — Mark Fischer
(74) *Attorney, Agent, or Firm* — EIP US LLP

(57) ABSTRACT

A system performs processing of transmitting, to a second-space side that is a second indoor space separated from a first space, a first picked-up image signal obtained by imaging the first space, and a first audio signal obtained by collecting sound in the first space, and processing of receiving, from the second-space side, a second picked-up image signal obtained by imaging a second space, and a second audio signal obtained by collecting sound in the second space, causing a first projector to output, to a first screen, a projection image, and causing a first speaker to output audio. The system further performs first image analysis processing of detecting a person in the first space based on the first picked-up image signal, and first directivity control process- (Continued)

ing of controlling a directivity of a first microphone so as to be directed to a position of the person in the first space.

7 Claims, 5 Drawing Sheets

(56) References Cited

U.S. PATENT DOCUMENTS

| | | |
|---|---|---|
| 2008/0298571 A1 | 12/2008 | Kurtz et al. |
| 2009/0079813 A1 | 3/2009 | Hildreth |
| 2011/0013075 A1 | 1/2011 | Kim et al. |
| 2012/0124603 A1* | 5/2012 | Amada ............... H04M 3/567 |
| | | 381/56 |
| 2013/0107028 A1 | 5/2013 | Gleisner et al. |
| 2017/0164447 A1* | 6/2017 | Rogers ............... H04N 23/56 |
| 2018/0310097 A1 | 10/2018 | Takahashi et al. |
| 2018/0352192 A1 | 12/2018 | Matsubara |
| 2019/0394316 A1 | 12/2019 | Zhang |
| 2021/0343307 A1 | 11/2021 | Namba et al. |

FOREIGN PATENT DOCUMENTS

| | | | |
|---|---|---|---|
| JP | 2010529738 A | | 8/2010 |
| JP | 2010-541398 A | | 12/2010 |
| JP | 2012-205242 A | | 10/2012 |
| JP | 2012-213013 A | | 11/2012 |
| JP | 2015-159391 A | | 9/2015 |
| JP | 2018148471 A | * | 9/2018 |
| JP | 2019-125972 A | | 7/2019 |
| JP | 2019146118 A | | 8/2019 |
| WO | 2008153822 A2 | | 12/2008 |
| WO | 2009042579 A1 | | 4/2009 |
| WO | 2017073324 A1 | | 5/2017 |
| WO | 2020079957 A1 | | 4/2020 |

OTHER PUBLICATIONS

English machine translation of JP-2018148471-A (Miyata, Yasushi; Sound quality adjustment system; published Sep. 2018) (Year: 2018).*
International Search Report dated Jun. 15, 2021 for PCT Application No. PCT/JP2021/011790.
Written Opinion dated Jun. 15, 2021 for PCT Application No. PCT/JP2021/011790.
Extended European Search Report dated Sep. 26, 2023 for Application No. 21797043.3.
Japanese OA dated Apr. 25, 2023 for Japanese Patent Application No. 2020-081110.
Chinese Office Action dated Dec. 7, 2024 for Chinese Application No. 202180031125.9.

* cited by examiner

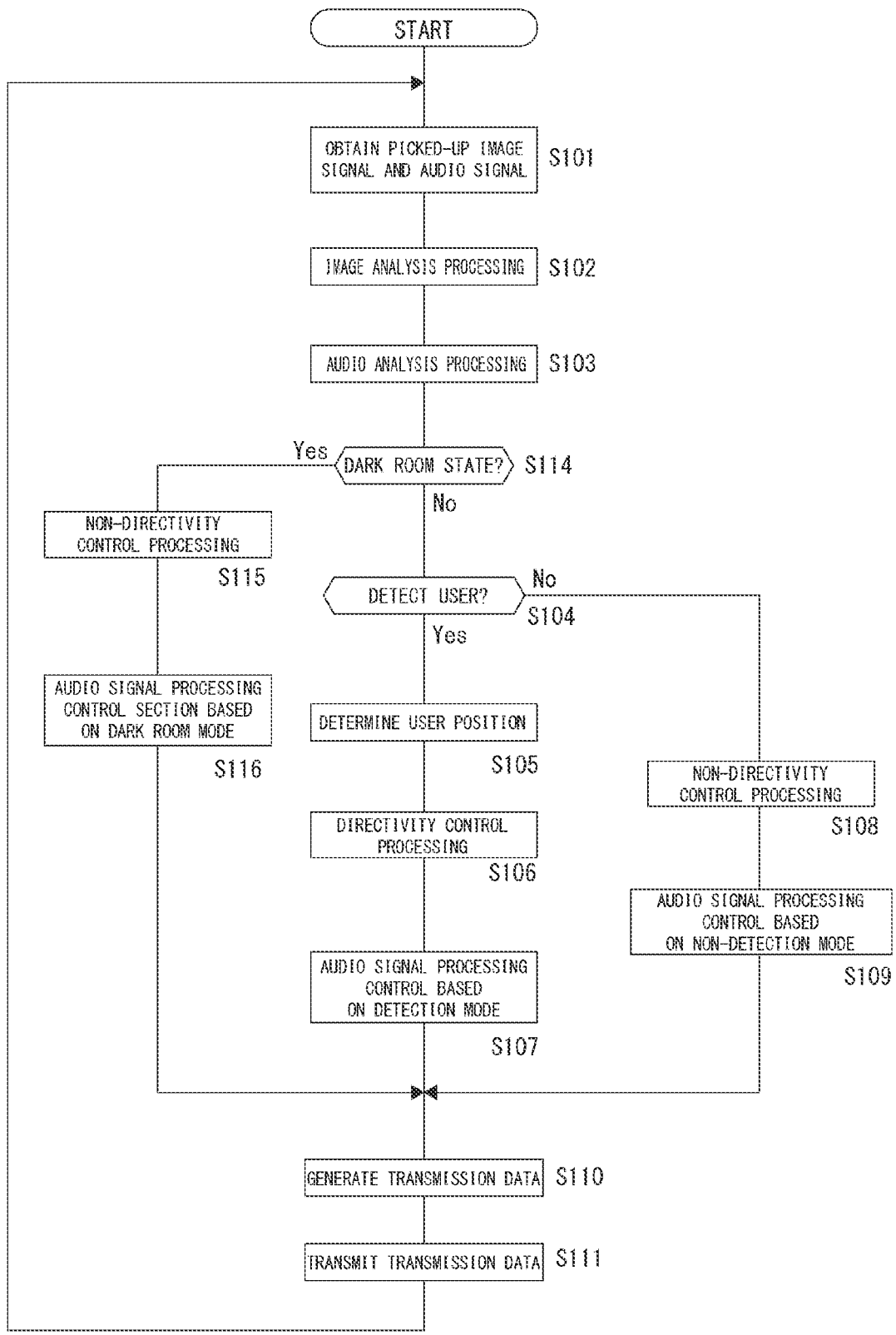

VIRTUAL SPACE CONNECTION DEVICE

CROSS-REFERENCE TO RELATED APPLICATIONS

This application is a 371 National Phase of International Application No. PCT/JP2021/011790, filed Mar. 22, 2021, which claims priority to Japanese Application No. JP 2020-081110, filed May 1, 2020, under 35 U.S.C. § 119 (a). Each of the above-referenced patent applications is incorporated by reference in its entirety.

TECHNICAL FIELD

The present technology relates to a technology of a virtual space connection device that virtually connects spaces separated from each other.

BACKGROUND ART

Communication means such as a videophone is known which outputs an image captured in one space and sound collected in the one space to another space to thereby allow users present in the respective spaces to have a conversation with each other.

PTL 1 discloses a communication device that transmits an image of a user captured by an imaging unit to a communication device of another user as a communication partner and that receives an image of the other user which image is transmitted from the communication device of the other user, to display the image on a display unit.

CITATION LIST

Patent Literature

PTL 1: Japanese Patent Laid-Open No. 2019-146118

SUMMARY OF INVENTION

Technical Problems

In the case of such communication means, it is desired that the users in the respective spaces not only simply have a conversation with each other but also communicate with each other with a sense of realism by sharing conditions of the mutual spaces.

In addition, in order to further enhance the sense of realism in each space, it is important how the sound collected in one space is output to the other space.

It is accordingly an object of the present invention to realize smooth communication between users present in spaces separated from each other, by virtually connecting the spaces and adjusting audio output according to conditions in the respective spaces.

Solution to Problems

A virtual space connection device according to the present invention includes a first arithmetic processing unit configured to perform processing of transmitting a first picked-up image signal obtained by imaging a first space and a first audio signal obtained by collecting sound in the first space to a second space side separated from the first space, receive a second picked-up image signal obtained by imaging the second space and a second audio signal obtained by collecting sound in the second space, and perform a display based on the second picked-up image signal and an audio output based on the second audio signal, a second arithmetic processing unit configured to perform processing of transmitting the second picked-up image signal and the second audio signal to the first space side separated from the second space, receive the first picked-up image signal and the first audio signal, and perform a display based on the first picked-up image signal and an audio output based on the first audio signal, a first display unit configured to virtually connect the second space to the first space by making the display based on the second picked-up image signal within the first space according to a control signal from the first arithmetic processing unit, and a second display unit configured to virtually connect the first space to the second space by making the display based on the first picked-up image signal within the second space according to a control signal from the second arithmetic processing unit. A parameter related to audio processing on the first audio signal is controlled according to conditions in the first space, and a parameter related to audio processing on the second audio signal is controlled according to conditions in the second space.

Thus, because, in each of the first space and the second space, an image of the other space is displayed and sound of the other space is output, the first space and the second space virtually are connected to each other.

Here, examples of conditions in a space include various conditions such as ambient sound conditions within the space such as noise or silence, user conditions within the space such as the presence or absence, head count, position, gesture, and orientation of a user or users, brightness and temperature within the space, weather conditions, and conditions where the space is provided such as indoor conditions or outdoor conditions.

In addition, a parameter related to audio processing refers to, for example, a parameter related to directivity control of an audio input unit, a parameter related to noise reduction processing, a parameter for encoding processing, a parameter related to amplification processing, a parameter related to sound quality processing for frequency characteristics, a voice change, or the like, and the like.

In the virtual space connection device according to the present invention described above, a parameter related to directivity of a microphone configured to collect sound which is the first audio signal may be controlled as the parameter related to the audio processing on the first audio signal, and a parameter related to directivity of a microphone configured to collect sound which is the second audio signal may be controlled as the parameter related to the audio processing on the second audio signal.

Thus, the first audio signal which is input to a first audio input unit and which has the directivity of the microphone controlled according to the conditions in the first space is transmitted to the second-space side separated from the first space, and is output by a second audio output unit in the second space. In addition, the second audio signal which is input to a second audio input unit and which has the directivity of the microphone controlled according to the conditions in the second space, is transmitted to the first-space side separated from the second space, and is output by a first audio output unit in the first space.

In the virtual space connection device according to the present invention described above, a parameter related to noise reduction processing on the first audio signal may be controlled as the parameter related to the audio processing on the first audio signal, and a parameter related to noise reduction processing on the second audio signal may be controlled as the parameter related to the audio processing on the second audio signal.

Thus, the first audio signal having undergone the noise reduction processing according to the conditions in the first space is transmitted to the second space side separated from the first space, and is output by the second audio output unit in the second space. In addition, the second audio signal having undergone the noise reduction processing according to the conditions in the second space is transmitted to the first space side separated from the second space, and is output by the first audio output unit in the first space.

In the virtual space connection device according to the present invention described above, a parameter related to attenuation processing on the first audio signal is controlled as the parameter related to the audio processing on the first audio signal, and a parameter related to attenuation processing on the second audio signal is controlled as the parameter related to the audio processing on the second audio signal.

Thus, the first audio signal having undergone the attenuation processing according to the conditions in the first space is transmitted to the second space side separated from the first space, and is output by the second audio output unit in the second space. In addition, the second audio signal having undergone the attenuation processing according to the conditions in the second space is transmitted to the first space side separated from the second space, and is output by the first audio output unit in the first space.

In the virtual space connection device according to the present invention described above, a parameter related to amplification processing on the first audio signal is controlled as the parameter related to the audio processing on the first audio signal, and a parameter related to amplification processing on the second audio signal is controlled as the parameter related to the audio processing on the second audio signal.

Thus, the first audio signal having undergone the amplification processing according to the conditions in the first space is transmitted to the second-space side separated from the first space, and is output by the second audio output unit in the second space. In addition, the second audio signal having undergone the amplification processing according to the conditions in the second space is transmitted to the first-space side separated from the second space, and is output by the first audio output unit in the first space.

In the virtual space connection device according to the present invention described above, the conditions within the first space may be determined on the basis of a result of analysis processing on the first picked-up image signal, and the conditions within the second space may be determined on the basis of a result of analysis processing on the second picked-up image signal.

Thus, when, for example, a user within one space is detected, the parameter related to the audio processing on the audio signal obtained by collecting sound within the one space is controlled in such a manner that a voice uttered by the user is transmitted to the other-space side.

In the virtual space connection device according to the present invention described above, luminance within the first space may be determined as the conditions within the first space, and luminance within the second space may be determined as the conditions within the second space.

Thus, when, for example, luminance within a space is low, it can be estimated that there is no user who intends to communicate in the space.

Advantageous Effects of Invention

According to the present invention, users present in spaces separated from each other can communicate with each other smoothly.

BRIEF DESCRIPTION OF DRAWINGS

FIG. 5 is a flowchart illustrating processing of an arithmetic device in a third embodiment.

DESCRIPTION OF EMBODIMENTS

Figure 1:
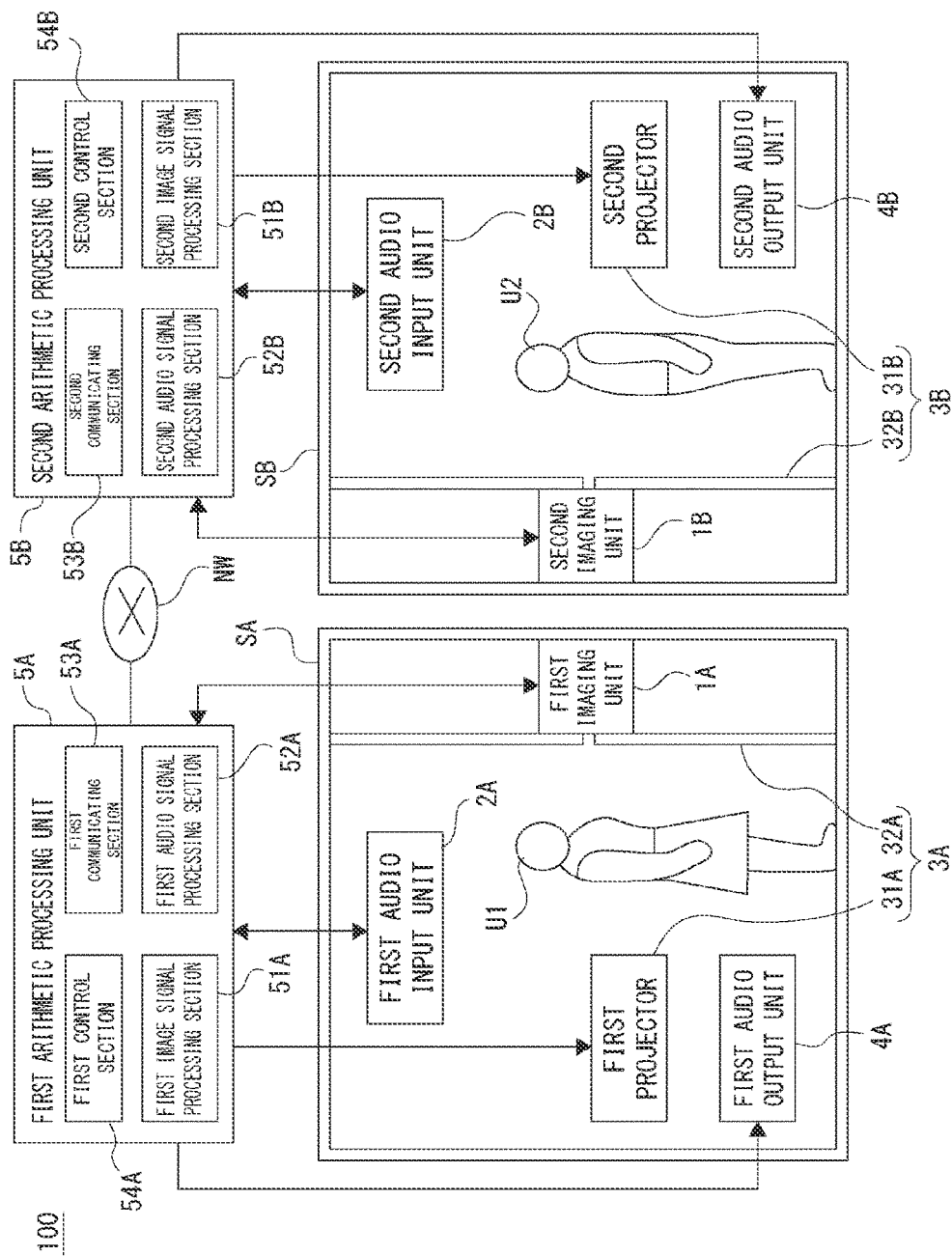
FIG. 1 is a diagram illustrating an outline of a virtual space connection device in an embodiment of the present invention.

In embodiments of the present invention, as an example, a virtual space connection device 100 will be described which virtually connects a first space SA and a second space SB separated from the first space SA to each other by outputting, to an own space as the first space SA or the second space SB, a picked-up image and sound of the other space.

The first space SA and the second space SB in the embodiments are, for example, indoor spaces and may represent various combinations such as a room in an own house and a room of a relative, a consulting room in a hospital and a room in the own house, an office of a company and a room in the own house, and an office of an own company and an office of another company. Thus, the virtual space connection device 100 according to the embodiments can virtually connect various spaces to each other.

In addition, in the following description, an image signal obtained by imaging on the first space SA side will be described as a first picked-up image signal, an audio signal obtained by collecting sound at the first-space-SA side will be described as a first audio signal, an image signal obtained by imaging at the second-space-SB side will be described as a second picked-up image signal, and an audio signal obtained by collecting sound on the second space SB side will be described as a second audio signal.

It is to be noted that respective configurations provided in the drawings to be referred to in the description represent only extracted configurations of principal parts related to the present invention, and that the configurations provided in the drawings can be changed in various manners according to design or the like without departing from the scope and spirit of the present invention.

In addition, a configuration described once in the following may subsequently be denoted by the same reference sign, and description thereof may be omitted. Further, the present invention is not limited to the embodiments, and modifications, improvements, and the like within the scope where the object of the present invention can be achieved are included in the present invention.

In the following, embodiments will be described in the following order.

(1. Configuration of Virtual Space Connection Device)
(2. Outline of Virtual Space Connection Device)
(3. First Embodiment)

(4. Second Embodiment)
(5. Third Embodiment)
(6 Summary)
(7. Modifications)

1. Configuration of Virtual Space Connection Device

Figure 2:
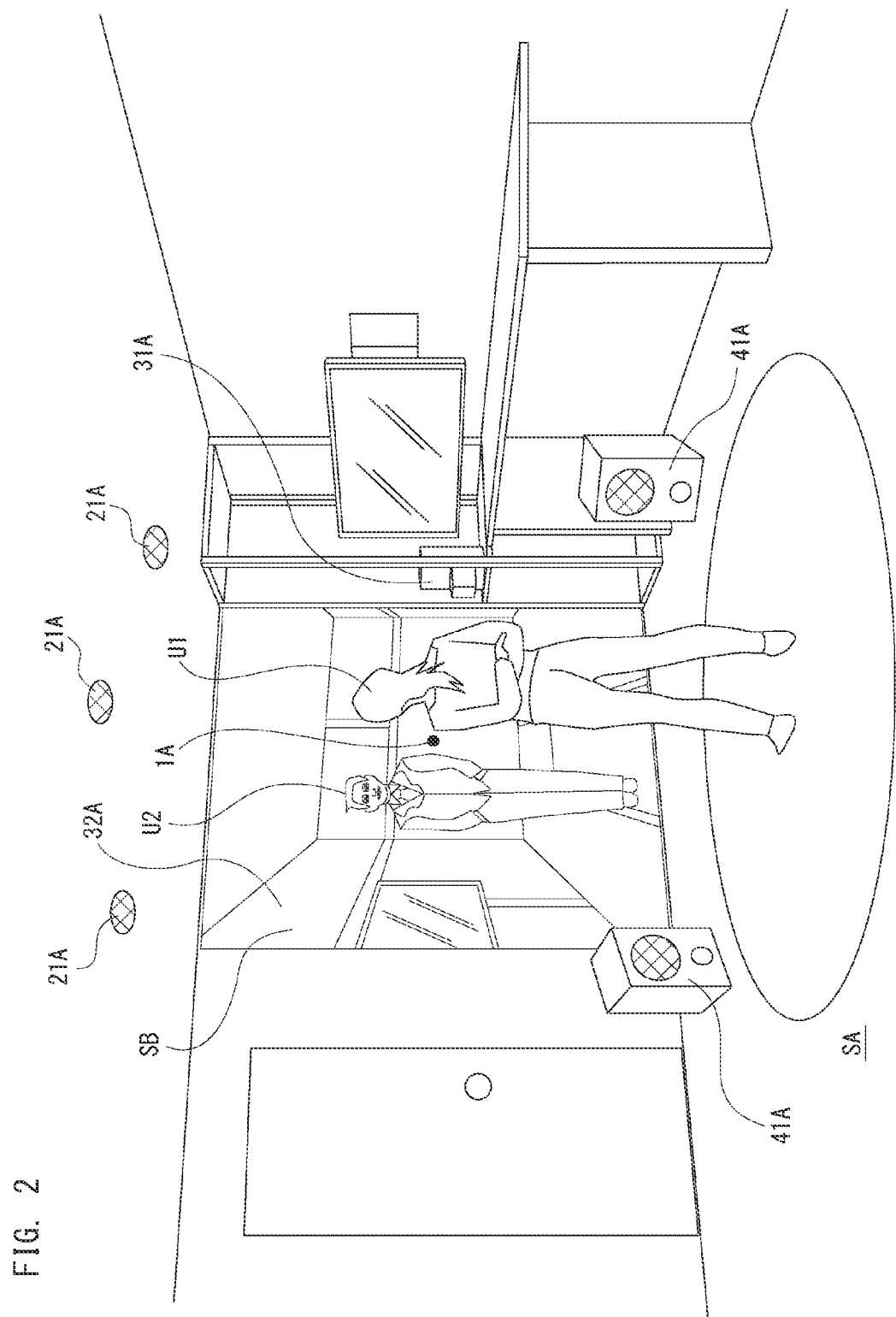
FIG. 2 is a diagram illustrating an example of implementation of the virtual space connection device in the embodiment.

A configuration of the virtual space connection device 100 according to the embodiments of the present invention will be described with reference to FIG. 1 and FIG. 2. FIG. 1 illustrates a configuration for a user U1 present in the first space SA and a user U2 present in the second space SB to perform communication while feeling as if the user U1 and the user U2 are actually present in adjacent rooms as illustrated in FIG. 2, by virtually connecting the first space SA and the second space SB to each other by the virtual space connection device 100.

In FIG. 1, the virtual space connection device 100 includes a first imaging unit 1A, a first audio input unit 2A, a first display unit 3A, a first audio output unit 4A, a first arithmetic processing unit 5A as well as a second imaging unit 1B, a second audio input unit 2B, a second display unit 3B, a second audio output unit 4B, and a second arithmetic processing unit 5B.

The first imaging unit 1A is provided in the first space SA. The first imaging unit 1A includes an imaging element configured as, for example, a Charge Coupled Device (CCD) type or a Complementary Metal Oxide Semiconductor (CMOS) type. The first imaging unit 1A performs photoelectric conversion on light received by the imaging element and outputs the converted light as a first picked-up image signal to the first arithmetic processing unit 5A.

The first audio input unit 2A is provided in the first space SA. The first audio input unit 2A includes a plurality of, for example, three, first microphones 21A (see FIG. 2). The first audio input unit 2A outputs a first audio signal, as an analog signal, of sound collected by each of the first microphones 21A to the first arithmetic processing unit 5A.

The first display unit 3A is provided in the first space SA. The first display unit 3A includes, for example, a first projector 31A and a first screen 32A. The first projector 31A performs an image output, or a projection output in this case, based on a second picked-up image signal of the second space SB, the second picked-up image signal being received from the second arithmetic processing unit 5B, to the first screen 32A.

The first audio output unit 4A is, for example, one or a plurality of first speakers 41A. The first audio output unit 4A is provided in the first space SA (see FIG. 2). The first audio output unit 4A obtains a second audio signal obtained by collecting sound in the second space SB from the first arithmetic processing unit 5A that has received the second audio signal, and the first audio output unit 4A performs an audio output based on the received second audio signal.

The first arithmetic processing unit 5A is, for example, built in the first projector 31A in the first space SA, or provided as a device separate from the first projector 31A. The first arithmetic processing unit 5A includes a first image signal processing section 51A, a first audio signal processing section 52A, a first communicating section 53A, and a first control section 54A.

The first image signal processing section 51A is, for example, configured to be as an image processing processor by a Digital Signal Processor (DSP), a Video Display Processor (VDP), or the like. Under control of the first control section 54A, the first image signal processing section 51A performs various kinds of signal processing such as Analog/Digital (A/D) conversion processing on the first picked-up image signal as an analog signal from the first imaging unit 1A. In addition, the first image signal processing section 51A performs various kinds of signal processing such as luminance signal processing, color processing, resolution conversion processing, and codec processing on the first picked-up image signal as a digital signal.

The first audio signal processing section 52A is, for example, configured to be as an audio processing processor by a DSP. Under control of the first control section MA, the first audio signal processing section 52A performs various kinds of signal processing such as Analog/Digital (A/D) conversion processing on the first audio signal as an analog signal from the first audio input unit 2A. In addition, the first audio signal processing section 52A performs various kinds of signal processing on the first audio signal as a digital signal. For example, the first audio signal processing section 52A performs beam forming processing, noise reduction processing, amplification processing, attenuation processing, sound quality processing, codec processing, and the like on the first audio signal.

Here, the beam forming processing is processing of controlling directivity in a sound collecting direction on the basis of a difference in sound wave propagations from a sound source to the respective first microphones 21A.

The first communicating section 53A performs data communication by wireless communication via a network NW with the second arithmetic processing unit 5B at the second-space-SB side under control of the first control section MA.

The first communicating section 53A transmits the first picked-up image signal obtained by imaging the first space SA and the first audio signal obtained by collecting sound in the first space SA, to the second arithmetic processing unit 5B at the second-space-SB side separated from the first space SA. In addition, the first communicating section 53A receives the second picked-up image signal obtained by imaging the second space SB and the second audio signal obtained by collecting sound in the second space SB, from the second arithmetic processing unit 5B at the second-space-SB side.

The first control section 54A is, for example, configured by a microcomputer including a Graphics Processing Unit (GPU), a Central Processing Unit (CPU), a Read Only Memory (ROM), a Random Access Memory (RAM), and the like.

The first control section 54A controls the first imaging unit 1A, the first audio input unit 2A, the first display unit 3A, the first audio output unit 4A, the first image signal processing section 51A, the first audio signal processing section 52A, and the first communicating section 53A.

In addition, the first control section 54A performs image analysis processing on the first picked-up image signal received from the first imaging unit 1A and performs audio analysis processing on the first audio signal received from the first audio input unit 2A. Then, the first control section 54A determines conditions in the first space SA on the basis of results of the image analysis processing and the audio analysis processing.

Here, the conditions in the space represent, for example, ambient sound conditions within the space such as noise or silence, user conditions within the space such as the presence or absence, head count, position, gesture, and orientation of a user or users, brightness and temperature within the space, weather conditions, and conditions where the space is provided such as indoor conditions or outdoor conditions.

Incidentally, in determining the conditions in the first space SA, analysis results of both the image analysis processing and the audio analysis processing may be used, or only one of the analysis results may be used. In addition, in a case in which one of the analysis results is used, the other analysis processing may not be performed.

The first control section 54A controls a parameter related to audio processing on the first audio signal, the audio processing being performed by the first audio signal processing section 52A, on the basis of a result of the determination of the conditions in the first space SA. Here, the parameter related to the audio processing is, for example, a parameter related to directivity control of each of the first microphones 21A, a parameter related to noise reduction processing, a parameter related to amplification processing or attenuation processing, a parameter related to sound quality processing for frequency characteristics, a voice change, or the like, or a parameter related to codec processing.

The first audio input unit 2A performs beam forming processing, noise reduction processing, amplification processing, attenuation processing, sound quality processing, codec processing, or the like on the basis of the parameter related to the audio processing, the parameter being obtained from the first control section MA.

Respective configurations of the second imaging unit 1B, the second audio input unit 2B, the second display unit 3B, the second audio output unit 4B, and the second arithmetic processing unit 5B are described by mutually replacing, in the above description of the configurations at the first-space-SA side, the first space SA and the second space SB, the first picked-up image signal and the second picked-up image signal, the first audio signal and the second audio signal, the first imaging unit 1A and the second imaging unit 1B, the first audio input unit 2A and the second audio input unit 2B, the first display unit 3A and the second display unit 3B, the first audio output unit 4A and the second audio output unit 4B, the first arithmetic processing unit 5A and the second arithmetic processing unit 5B, the first microphones 21A and second microphones 21B, the first projector 31A and a second projector 31B, the first screen 32A and a second screen 32B, the first speaker or speakers 41A and a second speaker or speakers 41B, the first image signal processing section 51A and a second image signal processing section 51B, the first audio signal processing section 52A and a second audio signal processing section 52B, the first communicating section 53A and a second communicating section 53B, and the first control section 54A and a second control section MB. Therefore, description of the configurations at the second-space-SB side will be omitted. In addition, when configurations and processing at the second-space-SB side, which are similar to those on the first space SA side, are omitted in the following description, replacements will be made as described above.

The embodiments of the present invention are implemented on the basis of the above configurations.

2. Example of Implementation of Virtual Space Connection Device

An example of implementation of the virtual space connection device according to the embodiments of the present invention will be described with reference to FIG. 2. FIG. 2 illustrates an example of a state in which the second space SB virtually is connected as viewed from the first-space-SA side. In the following, description will be made of an example in which the first space SA and the second space SB are rooms in buildings different from each other.

Arranged at the first space SA side are the first imaging unit 1A, the three first microphones 21A, the first projector 31A including the first arithmetic processing unit 5A, the first screen 32A, and the two first speakers 41A.

The first arithmetic processing unit 5A is connected to each of the first imaging unit 1A, the first microphones 21A, the first projector 31A, and the first speakers 41A in a wired or wireless manner.

The first screen 32A is, for example, provided on a wall surface of the first space SA in such a manner as to spread from a floor surface to a ceiling. The first projector 31A is, for example, provided on a side of the first screen 32A. Here, the first projector 31A is provided on a right side of the first screen 32A as viewed from the user U1. In addition, the first projector 31A is provided at a height around a center in a height direction of the first screen 32A.

The first projector 31A performs image projection, based on the second picked-up image signal at the second-space-SB side, from the side of the first screen 32A onto the first screen 32A. Consequently, a picked-up image of the second space SB is displayed on the first screen 32A, and thus the user U2 present in the second space SB and a state of the second space SB are displayed on the first space SA side. Hence, the user U1 present in the first space can visually recognize conditions on the second space SB side in real time.

The first speakers 41A are arranged at the respective left and right sides of the first screen 32A. In this case, the first speakers 41A are arranged on the left and right sides of the first screen 32A in front as viewed from the user U1.

The first speakers 41A output sound based on the second audio signal at the second-space-SB side, and thus the voice of the user U2 present in the second space SB, ambient sound in the second space SB, and the like, are output at the first-space-SA side. The user U1 present in the first space SA thus can aurally recognize conditions at the second-space-SB side in real time.

The first screen 32A and the first speakers 41A thus enable the user U1 present in the first space SA to recognize the conditions on the second space SB side visually and aurally in real time. The user U1 thus can obtain a feeling as if the second space SB is an adjacent room.

The first imaging unit 1A is placed at a back side of the first screen 32A. The first imaging unit 1A is, for example, a small digital camera having an imaging lens with a width of substantially 2 mm. The first screen 32A is provided with an infinitesimal hole at a height around the neck of the user U1 in the first space SA (for example, at a height of approximately 145 cm from the floor surface) and in a central portion in a width direction of the first screen 32A. The small digital camera is placed in such a manner that the imaging lens of the small digital camera is fitted in the hole.

By imaging the first space SA from the first screen 32A side by the first imaging unit 1A, it is possible to implement imaging as if the first space SA is viewed from the second space SB side. In addition, by providing the first imaging unit 1A at a height around the neck of the user U1, it is possible to image, substantially from the front, the user U1 in the first space SA and attempting to have a conversation with the user U2 in the second space SB. It is thus possible to perform imaging as if a line of sight of the user U1 in the first space SA is directed to the user U2 in the second space SB.

The first picked-up image signal obtained by the imaging by the first imaging unit 1A is subjected to predetermined processing by the first arithmetic processing unit 5A and is then transmitted to the second arithmetic procedure unit 5B at the second-space-SB side.

Thereafter, the unillustrated second projector 31B at the second-space-SB side performs image projection, based on the first picked-up image signal at the first-space-SA side, onto the unillustrated second screen 32B. A picked-up image of the first space SA is thus displayed. At this time, a life-size image of the first space SA side is displayed in order to emphasize real-time communication and a feeling as if the counterpart are present very near.

Thus, the user U2 in the second space SB can also visually recognize conditions at the first-space-SA side while being present in the second space SB.

In the first space SA, the three first microphones 21A are arranged on, for example, the ceiling of the first space SA in such a manner as to be separated from each other.

The first audio signal obtained by collecting sound by the first microphones 21A is subjected to predetermined processing by the first arithmetic processing unit 5A and is then transmitted to the second arithmetic procedure unit 5B at the second-space-SB side. The unillustrated second speaker or speakers 41B arranged at the second-space-SB side output sound based on the first audio signal at the first-space-SA side. Thus, the user U2 in the second space SB can also aurally recognize conditions at the first-space-SA side while being present in the second space SB.

As described above, the virtual space connection device 100 according to the embodiments of the present invention virtually connects the first space SA and the second space SB to each other at all times by mutually and continuously performing the processing of outputting, at the other space the picked-up image signal and the audio signal input in one space.

Thus, the user U1 and the user U2 can obtain a feeling as if the mutual spaces are present as rooms adjacent to each other. In addition, the user U1 in the first space SA and the user U2 in the second space SB can recognize the mutual spaces and perform communication through conversations, movement, and the like, without a feeling of strangeness.

Incidentally, the connection at all times in this case means a state in which mutual communication of picked-up images and audio signals is performed at all times irrespective of the presence or absence of users, and also means connection to a counterpart in a state in which a user can talk using sound and an image at any time.

3. First Embodiment

An example of processing performed by the first control section 54A to carry out a first embodiment will be described with reference to FIG. 3. In the first embodiment, the first control section 54A determines the conditions in the first space SA according to the presence or absence of the user U1 and controls a parameter related to audio processing according to a result of the determination.

Incidentally, processing in each embodiment to be described in the following is performed also by the second control section 54B at the second-space-SB side in a similar manner Hence, description of the processing by the second control section 54B will be omitted.

First, the first control section 54A in step S101 obtains the first picked-up image signal received from the first imaging unit 1A and the first audio signal received from the first audio input unit 2A.

Then, the first control section 54A in step S102 performs image analysis processing based on the first picked-up image signal from the first imaging unit 1A frame by frame. The first control section 54A detects the user U1 within the first space SA by the image analysis processing based on the first picked-up image signal, and obtains positional information (a coordinate value on the screen, information regarding a subject distance, and the like), size information (for example, a horizontal width, a height, the number of pixels, and the like, of the user U1), attribute information (for example, a gender, an age, and the like), and the like of the user U1.

The image analysis processing may extract an image of the user U1 by a scheme of pattern matching or may, for example, detect a moving body by a scheme of moving body detection based on a frame difference and detect the user U1 from the moving body. The scheme of detecting the user U1 is not limited to the above, and various scheme are conceivable.

In addition, the first control section 54A in step S103 performs audio analysis processing based on the first audio signal received from the first audio input unit 2A. The first control section 54A obtains audio kind-by-kind information, such as a talking voice of the user U1, and ambient sound within the first space SA, by performing the audio analysis processing.

At this time, the first control section 54A can obtain positional information on the user U1 (the coordinate value of the sound source in the first space SA, distance information regarding a distance to the sound source, and the like) on the basis of a difference in sound wave propagations from the sound source to the respective first microphones 21A in the first audio input unit 2A.

The first control section 54A in step S104 determines the conditions in the first space SA on the basis of the various kinds of information obtained by the image analysis processing and the audio analysis processing. In the first embodiment, whether or not the user U1 is detected in the first space SA is determined as an example of determining the conditions in the first space SA.

Incidentally, the first control section 54A may determine the conditions in the first space SA on the basis of the information obtained by either one of the image analysis processing or the audio analysis processing. In this case, the first control section MA skips the processing in either step S102 or S103 and advances the processing to step S104.

When the user U1 is detected in the first space SA in step S104, the first control section 54A determines that a present mode is a detection mode, and advances the processing to step S105.

The first control section 54A in step S105 determines the position of the user U1 on the basis of the positional information obtained by the image analysis processing and the audio analysis processing.

Then, the first control section 54A advances the processing to step S106 to perform directivity control processing. As the directivity control processing, the first control section 54A controls a parameter related to the directivity of the first audio signal obtained by collecting sound, as a parameter related to the audio processing on the first audio signal. In this case, the first control section 54A sets a parameter of beam forming processing, for example.

The first control section 54A performs parameter control that enables sound collection of the first audio signal with such directivity that a sound collecting position is made to coincide with the determined position of the user U1, and transmits a corresponding control signal to the first audio signal processing section 52A.

Thus, the beam forming processing enables the first audio signal processing section 52A to obtain an easily audible audio signal, which is obtained by collecting mainly the sound of a voice uttered from the user U1.

Next, the first control section 54A in step S107 performs audio signal processing control on the first audio signal processing section 52A based on the detection mode. As the audio signal processing control, the first control section 54A performs various kinds of parameter control on, for example, a parameter related to noise reduction processing, a parameter related to amplification processing or attenuation processing for the first audio signal, and the like.

As parameter control related to the noise reduction processing, for example, the first control section 54A performs parameter control for performing filter processing as a low-pass filter, a high-pass filter, a band-pass filter, and the like in such a manner as to emphasize the voice of the user U1, on the basis of frequencies of the voice uttered by the user U1.

In addition, directing attention to a difference in frequency band of the voice according to the gender of the user U1, the first control section 54A may perform parameter control for performing filter processing that emphasizes a frequency band of the voice, the frequency band being assumed for the gender, on the basis of the gender information of the user U1 obtained by the image analysis processing.

Further, the first control section 54A may obtain the audio kind-by-kind information of the ambient sound within the first space SA on the basis of the audio analysis processing, and perform parameter control for performing filter processing on the basis of the audio kind-by-kind information. For example, the first control section 54A performs parameter control for performing filter processing on a frequency band to be determined as noises in the ambient sound within the first space SA.

In addition, for example, as parameter control related to the amplification processing or the attenuation processing on the first audio signal, the first control section 54A performs, in a case in which the user U1 is present in the first space SA, parameter control for performing the amplification processing on the first audio signal in such a manner that a sense of realism is communicated when communication is performed.

The first control section 54A makes the first audio signal processing section 52A perform audio signal processing based on the various kinds of parameters as described above. When the first control section 54A thereafter ends the processing in step S107, the first control section 54A advances the processing to step S110.

When the user U1 is not detected in the first space SA in step S104, conversely, the first control section 54A determines that the present mode is a non-detection mode, and advances the processing to step S108.

The first control section 54A in step S108 performs non-directivity control processing. The first control section 54A resets the parameter related to the directivity of the first audio signal, as non-directivity control, and transmits to the first audio signal processing section 52A such a control signal as to make the directivity of the first audio signal non-directive. This enables the first audio signal processing section 52A to perform audio signal processing in which the directivity in the sound collecting direction is not taken into account.

Next, the first control section 54A performs audio signal processing control based on the non-detection mode in step S109.

As the audio signal processing control, the first control section 54A performs various kinds of parameter control on, for example, a parameter related to noise reduction processing, a parameter related to amplification processing or attenuation processing on the first audio signal, and the like.

For example, as parameter control related to the noise reduction processing, the first control section 54A performs parameter control for performing filter processing on an entire frequency band. The first audio signal processing section 52A thus performs audio processing based on the parameter. Consequently, when the user U1 is not present in the first space SA, the ambient sound at the first-space-SA side can be blocked on the second space SB side.

In addition, for example, as parameter control related to the amplification processing or the attenuation processing on the first audio signal, the first control section MA performs parameter control for performing the attenuation processing on the first audio signal when the user U1 is not present in the first space SA. Thus, when the user U1 is not present in the first space SA, the ambient sound at the first-space-SA side can be reduced on the second space SB side.

The first control section 54A makes the first audio signal processing section 52A perform audio signal processing based on the various kinds of parameters as described above. When the first control section 54A thereafter ends the processing in step S109, the first control section 54A advances the processing to step S110.

In the step S110, for the first audio signal having undergone the signal processing by the first audio signal processing section 52A and the first picked-up image signal having undergone the signal processing by the first image signal processing section MA, the first control section 54A generates transmission data for transmission to the second arithmetic processing unit 5B at the second-space-SB side. Then, the first control section 54A in step S111 transmits the generated transmission data to the second arithmetic processing unit 5B.

On the basis of the received transmission data, the second arithmetic processing unit 5B makes the second display unit 3B display a picked-up image based on the first picked-up image signal, and makes the second audio output unit 4B output sound based on the first audio signal. The image and the sound of the first space SA side are thus output to the second space SB side.

When the first control section 54A ends the processing in step S111, the first control section 54A returns the processing to step S101 and thereafter repeatedly performs similar processing. Hence, the image and the sound at the first-space-SA side are output to the second space SB at all times, and thus the first space SA virtually is connected to the second space SB.

Through the above-described operations, the processing by the first control section 54A in the first embodiment is accomplished.

4. Second Embodiment

Figure 4:
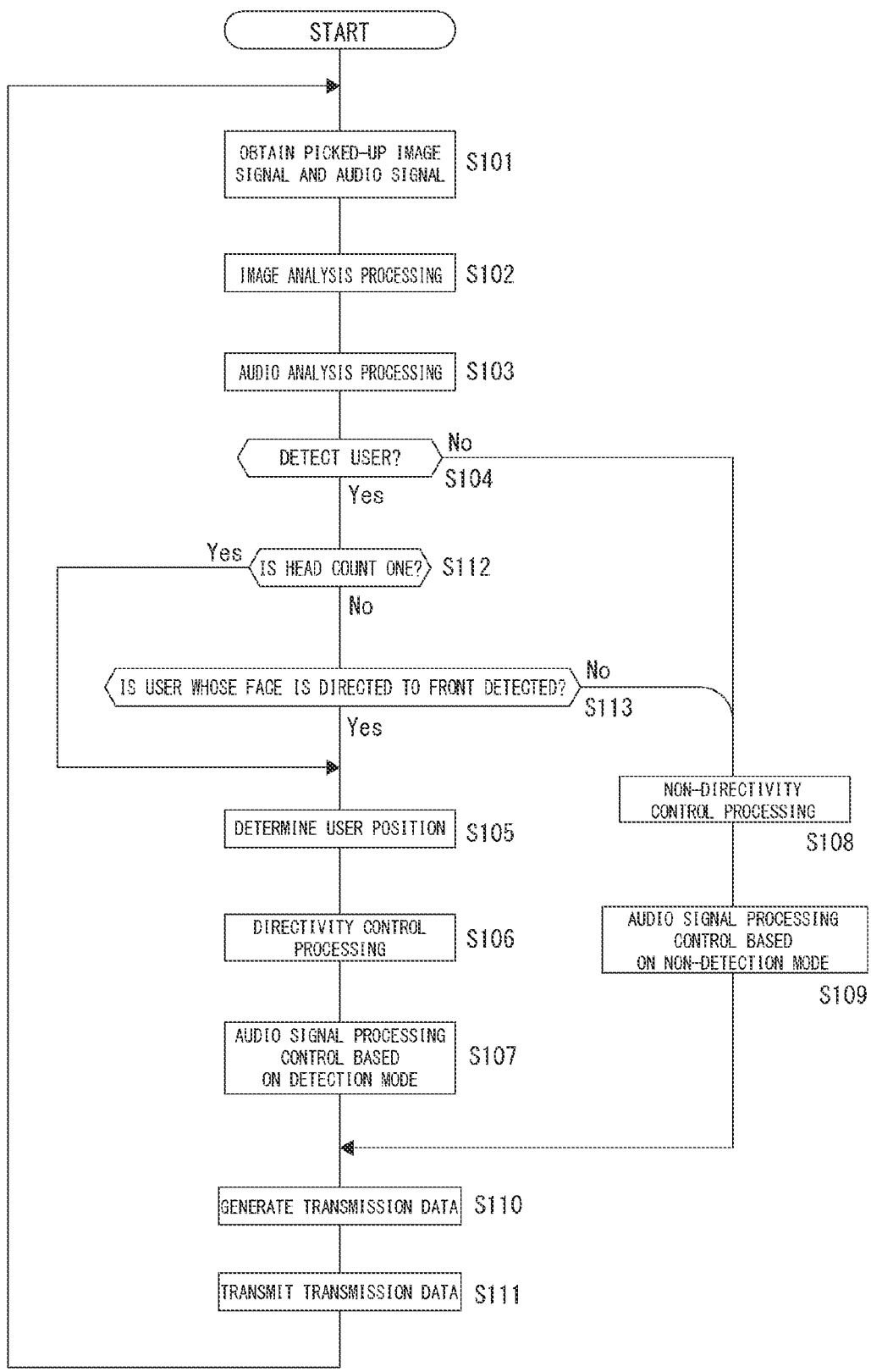
FIG. 4 is a flowchart illustrating processing of an arithmetic device in a second embodiment.

An example of processing performed by the first control section 54A to carry out a second embodiment will be described with reference to FIG. 4. In the second embodiment, the first control section 54A determines the conditions in the first space SA according to the direction of the face of the user U1 and controls a parameter related to audio processing according to a result of the determination.

The first control section 54A obtains the first picked-up image signal and the first audio signal in step S101, performs image analysis processing based on the first picked-up image signal in step S102, and performs audio analysis processing based on the first audio signal in step S103.

In this case, the first control section 54A obtains, through the image analysis processing, head count information of a user or users U1 and information related to the posture of the user or users U1 such as the direction of face, in addition to the positional information, size information, attribute information, and the like of the user or users U1.

In step S104, on the basis of various kinds of information obtained by the image analysis processing and the audio analysis processing, the first control section MA determines whether or not the user or users U1 are detected in the first space SA, and determines the head count of the user or users U1 if detected.

First, when the first control section 54A determines that one user U1 is present in the first space SA, the first control section 54A determines that the present mode is the detection mode, and advances the processing from the step S104 to steps S112 and S105 in this order.

Then, the first control section 54A determines the position of the user U1 in the step S105, and performs in step S106 directivity control processing with such directivity that the sound collecting position is aligned with the position of the user U1. In addition, the first control section 54A performs audio signal processing control based on the detection mode in step S107.

Next, when the first control section 54A determines that there are a plurality of users U1 in the first space SA, the first control section 54A determines that the present mode is the detection mode, and advances the processing from the step S104 to steps S112 and S113 in this order.

The first control section 54A in the step S113 determines whether or not there is a user U1 whose face is directed to the front (who faces the first screen 32A) on the basis of the information related to the posture of the users U1 obtained by the image analysis processing.

When the first control section 54A determines that there is a user U1 whose face is directed to the front, the first control section 54A estimates that the user U1 whose face is directed to the front intends to have a conversation with the user U2 on the second space SB side.

Then, the first control section 54A advances the processing from step S113 to the step S105, where the first control section 54A determines the position of the user U1 whose face is directed to the front. The first control section 54A in the step S106 performs directivity control that controls the parameter with such directivity that the sound collecting position is aligned with the position of the user U1 whose face is directed to the front. In addition, the first control section 54A in the step S107 performs audio signal processing control based on the detection mode. The first control section MA thereafter advances the processing from step the S107 to step S110.

Conversely, when the first control section 54A determines in step S113 that there is no user U1 whose face is directed to the front, the first control section 54A estimates that there is currently no user U1 in the first space SA who intends to have a conversation with the user U2 in the second space SB. Accordingly, the first control section 54A performs non-directivity control processing in step S108, and performs audio signal processing control based on the non-detection mode in step S109. The first control section 54A thereafter advances the processing from the step S109 to the step S110.

Incidentally, when no user U1 is detected in the first space SA in the step S104, the first control section 54A determines that the present mode is the non-detection mode, performs non-directivity control processing in the step S108, and performs audio signal processing control based on the non-detection mode in the step S109. The first control section 54A thereafter advances the processing from the step S109 to the step S110.

After performing the above-described processing, the first control section 54A in the step S110 generates transmission data for transmission to the second arithmetic processing unit 5B at the second-space-SB side for the first audio signal and the first picked-up image signal. Then, the first control section 54A in step S111 transmits the generated transmission data to the second arithmetic processing unit 5B.

When the first control section 54A ends the processing in the step S111, the first control section 54A returns the processing to step S101 and thereafter repeatedly performs similar processing.

The processing by the first control section 54A in the second embodiment is accomplished as described above.

5. Third Embodiment

An example of processing performed by the first control section 54A to carry out a third embodiment will be described with reference to FIG. 5. In the third embodiment, the first control section 54A determines the conditions in the first space SA on the basis of luminance of the first space SA, and controls a parameter related to audio processing according to a result of the determination.

The first control section 54A obtains the first picked-up image signal and the first audio signal in step S101, performs image analysis processing based on the first picked-up image signal in step S102, and performs audio analysis processing based on the first audio signal in step S103.

In this case, through the image analysis processing, the first control section 54A obtains luminance information of the first space SA in addition to the positional information, size information, attribute information, and the like of the user U1.

Then, the first control section 54A in step S114 determines whether or not the first space SA is in a dark room state. For example, the first control section 54A determines whether or not the first space SA is in a dark room state on the basis of a comparison between a value of the luminance of the first space SA, the value being obtained by the image analysis processing, and a predetermined threshold value.

When the first space SA is in a dark room state, the first control section MA determines that the present mode is a dark room mode, and advances the processing to step S115.

The first control section 54A performs non-directivity control processing in the step S115, and performs audio signal processing based on the dark room mode in step S116.

For example, as parameter control related to noise reduction processing, the first control section 54A performs parameter control for performing filter processing on an entire frequency band. The first audio signal processing section 52A thus performs audio processing based on the parameter. Consequently, when the first space SA is in a dark room state, the ambient sound at the first-space-SA side can be blocked in the second space SB.

In addition, for example, as parameter control related to amplification processing or attenuation processing on the first audio signal, the first control section 54A performs parameter control for performing the attenuation processing on the first audio signal when the first space SA is in a dark room state. Thus, when the first space SA is in a dark room state, the ambient sound at the first-space-SA side can be reduced in the second space SB.

In step S110, for the first audio signal having undergone the signal processing by the first audio signal processing section 52A and the first picked-up image signal having undergone the signal processing by the first image signal processing section 51A, the first control section 54A generates transmission data for transmission to the second arithmetic processing unit 5B at the second-space-SB side. Then, the first control section 54A in step S111 transmits the generated transmission data to the second arithmetic processing unit 5B.

On the basis of the received transmission data, the second arithmetic processing unit 5B makes the second display unit 3B display a picked-up image based on the first picked-up image signal, and makes the second audio output unit 4B output sound based on the first audio signal. The image and the sound at the first-space-SA side are thus output to the second-space-SB side.

When the first control section 54A ends the processing in the step S111, the first control section 54A returns the processing to the step S101 and thereafter repeatedly performs similar processing. Incidentally, the subsequent processing from the step S104 by the first control section 54A is similar to the processing described in the first embodiment, and therefore, description thereof will be omitted.

The processing by the first control section 54A in the third embodiment is accomplished as described above.

6. Summary and Modifications

Figure 3:
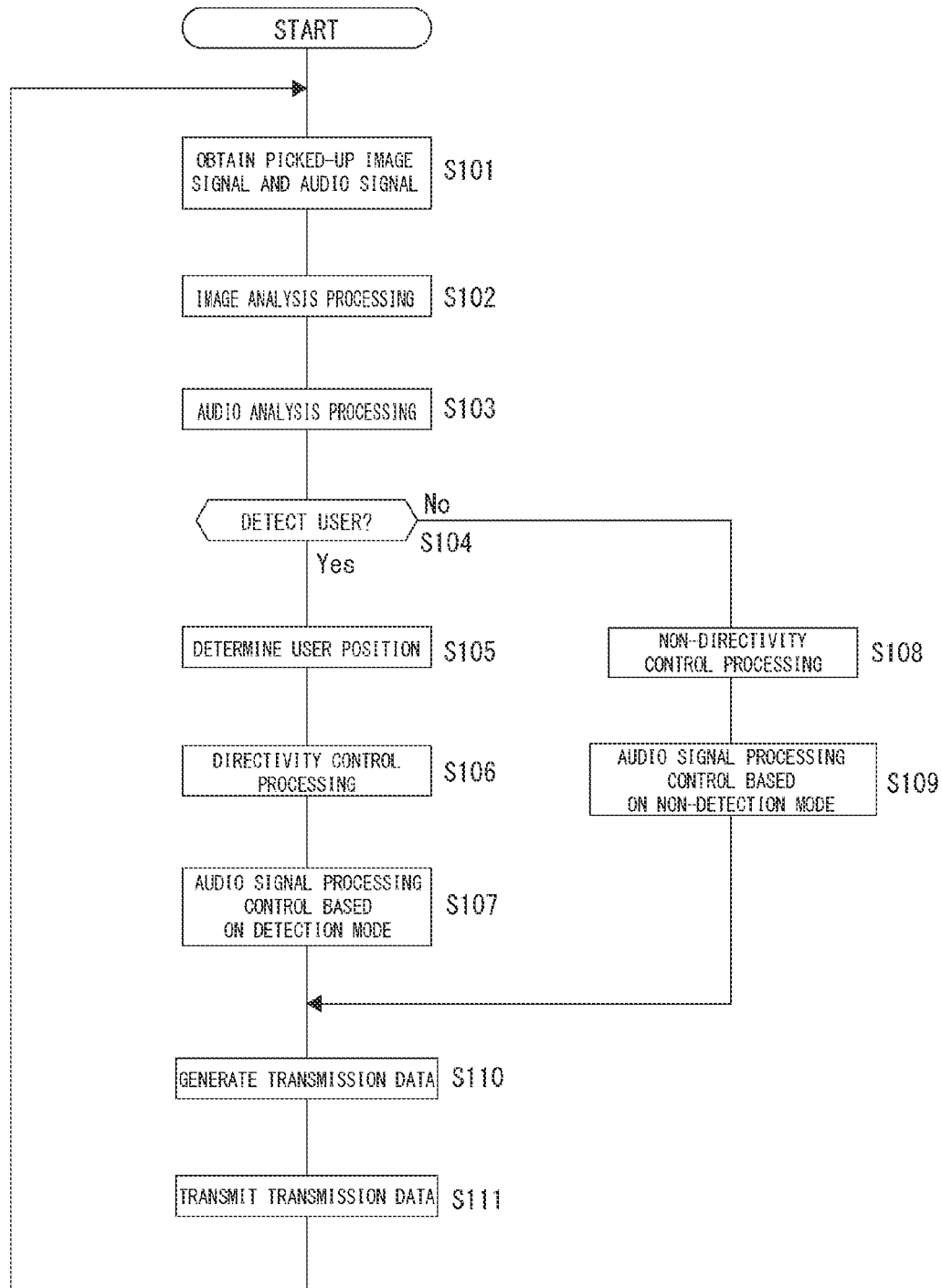
FIG. 3 is a flowchart illustrating processing of an arithmetic device in a first embodiment.

The virtual space connection device 100 according to the above-described embodiments includes: the first arithmetic processing unit SA configured to perform processing of transmitting the first picked-up image signal obtained by imaging the first space SA and the first audio signal obtained by collecting sound in the first space SA to the second space SB side separated from the first space SA, receive the second picked-up image signal obtained by imaging the second space SB and the second audio signal obtained by collecting sound in the second space SB, and perform a display based on the second picked-up image signal and an audio output based on the second audio signal; the second arithmetic processing unit 5B configured to perform processing of transmitting the second picked-up image signal and the second audio signal to the first space SA side separated from the second space SB, receive the first picked-up image signal and the first audio signal, and perform a display based on the first picked-up image signal and an audio output based on the first audio signal; the first display unit 3A configured to virtually connect the second space SB to the first space SA by making the display based on the second picked-up image signal within the first space SA according to a control signal from the first arithmetic processing unit 5A; and the second display unit 3B configured to virtually connect the first space SA to the second space SB by making the display based on the first picked-up image signal within the second space SB according to a control signal from the second arithmetic processing unit 5B, in which the first arithmetic processing unit 5A controls a parameter related to audio processing on the first audio signal according to conditions in the first space SA, and the second arithmetic processing unit 5B controls a parameter related to audio processing on the second audio signal according to conditions in the second space SB (see FIG. 1 and FIG. 3 or the like).

Thus, because, in each of the first space SA and the second space SB, an image of the other space is displayed and sound of the other space is output, the first space SA and the second space SB virtually are connected to each other, sound reflecting the conditions in the second space SB is output from the first audio output unit 4A, and sound reflecting the conditions in the first space SA is output from the second audio output unit 4B.

Hence, by virtually connecting the spaces separated from each other, users present in respective places separated from each other, such as one room in an own house and an office as a workplace, can share the mutual spaces in a pseudo manner and communicate with each other.

In addition, according to conditions in one space, audio output to the other space is adjusted. The users present in respective adjacent spaces can realize realistic smooth communication with each other without a feeling of strangeness.

In the virtual space connection device 100 in an embodiment, the first projector 31A performs image output based on the second picked-up image signal at the second-space-SB side, the second picked-up image signal being received from the first arithmetic processing unit 5A, from the side of the first screen 32A to the first screen 32A (see FIG. 1 and FIG. 2 or the like).

Thus, because the second space SB is displayed by using the first screen 32A, a display region for the second space SB can be provided within the first space SA more easily than in the case of using a liquid crystal panel or the like.

In addition, because the first projector 31A projects a picked-up image from the side of the first screen 32A, the realism of a video can be prevented from being impaired when a shadow caused by the falling of light from the first projector 31A onto the user U1 or the like is projected onto the first screen 32A. In addition, a projection occupying an area from the floor to the ceiling is made possible by providing the first projector 31A on the side of the first screen 32A. The same is true for the second space SB side.

In the virtual space connection device 100 according to an embodiment, the first arithmetic processing unit 5A controls a parameter related to directivity of the first microphones 21A that collect sound which is the first audio signal as the parameter related to the audio processing on the first audio signal, and the second arithmetic processing unit 5B controls a parameter related to directivity of the second microphones 21B that collect sound which is the second audio signal as the parameter related to the audio processing on the second audio signal (see S106 and S108 in FIG. 3 or the like).

Thus, the first audio signal input to the first audio input unit 2A that has sound collection directivity in the first space SA controlled according to the conditions in the first space SA, is transmitted to the second-space-SB side separated from the first space SA, and is output by the second audio output unit 4B in the second space SB. In addition, the second audio signal input to the second audio input unit 2B that has sound collection directivity in the second space SB controlled according to the conditions in the second space SB, is transmitted to the first-space-SA side separated from the second space SB, and is output by the first audio output unit 4A in the first space SA.

Hence, because the directivity in sound collecting directions is controlled according to the conditions in the spaces, for example, specific sound such as a talking voice of a user can be emphasized and output to the other-space side, or noise, etc., from another direction can be attenuated and output to the other space. This enables the users present in the mutual spaces to carry out smooth communication with each other.

In the virtual space connection device 100 according to an embodiment, the first arithmetic processing unit 5A controls a parameter related to noise reduction processing on the first audio signal as the parameter related to the audio processing on the first audio signal, and the second arithmetic processing unit 5B controls a parameter related to noise reduction processing on the second audio signal as the parameter related to the audio processing of the second audio signal (see S107 and S109 in FIG. 3 or the like).

Thus, the first audio signal having undergone the noise reduction processing according to the conditions in the first space SA is transmitted to the second-space-SB side separated from the first space SA, and is output by the second audio output unit 4B in the second space SB. In addition, the second audio signal having undergone the noise reduction processing according to the conditions in the second space SB is transmitted to the first-space-SA side separated from the second space SB, and is output by the first audio output unit 4A in the first space SA.

Hence, processing like filtering for specific frequencies according to the conditions in the spaces is made possible. It is therefore possible to emphasize the voices of the users by filtering frequencies out of the frequency band for the talking voices of the users, or to make noise less noticeable by filtering a frequency band corresponding to such noise. This also enables the users to achieve smooth communication with each other.

In the virtual space connection device 100 according to an embodiment, the first arithmetic processing unit 5A determines conditions within the first space SA on the basis of a result of analysis processing on the first picked-up image signal, and the second arithmetic processing unit 5B determines conditions within the second space SB on the basis of a result of analysis processing on the second picked-up image signal (see S102 and S104 in FIG. 3 or the like).

Thus, when, for example, the user U1 within the first space SA is detected, the parameter related to the audio processing on the first audio signal obtained by collecting sound within the first space SA can be controlled in such a manner that a voice uttered by the user U1 is transmitted to the second-space-SB side.

By determining the conditions within the spaces on the basis of the results of the analysis processing on the picked-up image signals, it is possible to, for example, highly precisely recognize the users, etc., present within the spaces.

In the virtual space connection device 100 according to the third embodiment, the first arithmetic processing unit 5A determines luminance within the first space SA as the conditions within the first space SA, and the second arithmetic processing unit 5B determines luminance within the second space SB as the conditions within the second space SB (see steps from S114 to S116 in FIG. 5 or the like).

Thus, when, for example, luminance within a space is low, it can be estimated that there is no user who intends to communicate in the space.

In such a case, output sound can be adjusted in such a manner that the sound of the first space SA side which sound is output to the second space SB side is reduced by, for example, attenuating the audio signal when the luminance is low.

7. Modifications

In the embodiments, description has been made of an example in which the user U1 present in the first space SA and the user U2 present in the second space SB communicate with each other. However, a user who intends to communicate with a user present in another space does not need to be present in the first space SA and the second space SB virtually connected to each other by the virtual space connection device 100. One space may simply be used so as to share a picked-up image and sound in the other space.

In the embodiments, as an example, the first space SA and the second space SB have been described as indoor spaces. However, the first space SA and the second space SB are not limited to indoor spaces and may be outdoor spaces as long as the first space SA and the second space SB are environments in which the respective configurations of the virtual space connection device can be placed. That is, an indoor space and an outdoor space can virtually be connected to each other, or an outdoor space and an outdoor space can virtually be connected to each other.

In the embodiments, one first imaging unit 1A is provided at substantially a central portion of the first screen 32A. However, the first imaging unit 1A may include a plurality of imaging devices to grasp peripheral space coordinates. The same is true for the second imaging unit 1B.

In the embodiments, description has been made of an example in which the first audio input unit 2A includes three microphones. However, the first audio input unit 2A may include two microphones or four or more microphones. When the number of microphones is increased, a degree of spatial freedom is increased, and sharp directivity can be obtained. The same is true for the second audio input unit 2B.

In the embodiments, description has been made of an example in which the first audio input unit 2A performs directivity control on each microphone and processing such as noise reduction processing, filing processing, amplification processing, or sound quality processing according to a control signal corresponding to the conditions in the first space SA from the first arithmetic processing unit 5A. However, the noise reduction processing, the filing processing, the amplification processing, the sound quality processing, or the like may be performed by the first arithmetic processing unit 5A.

In this case, the first arithmetic processing unit 5A performs, on the first audio signal received from the first audio input unit 2A, processing such as the noise reduction processing, the filing processing, the amplification processing, or the sound quality processing according to the conditions in the first space SA. The same is true for the second space SB side.

In the embodiments, the first arithmetic processing unit 5A and the second arithmetic processing unit 5B perform data communication by wireless communication via the network NW (see FIG. 1). However, a communication scheme is not limited to wireless communication, and the data communication may be performed by wired communication.

In addition, in the embodiments, description has been made of an example in which the first image signal processing section 51A of the first arithmetic processing unit 5A performs, on the first picked-up image signal as an analog signal from the first imaging unit 1A, various kinds of signal processing such as A/D conversion processing. However, the various kinds of signal processing may be performed at the first-imaging-unit-1A side. Similarly, as for the second image signal processing section 51B of the second arithmetic processing unit 5B, the various kinds of signal processing may be performed at the second-imaging-unit-1B side.

In the embodiments, description has been made of an example in which the first display unit 3A at the first-space-SA side includes the first projector 31A and the first screen 32A. However, the first display unit 3A may include an imaging control device and a display unit. Here, the display unit is, for example, a display panel configured by a display device such as a liquid crystal panel (Liquid Crystal Display: LCD) or an organic Electro-Luminescence (EL) display. In this case, the imaging control device and the display unit are connected to each other in a wired or wireless manner, and the display unit displays a picked-up image at the second-space-SB side according to output from the imaging control device. The same is true for the second display unit 3B at the second-space-SB side.

In the embodiments, the first control section 54A at the first-space side performs image analysis processing on the first picked-up image signal received from the first imaging unit 1A and audio analysis processing on the first audio signal received from the first audio input unit 2A, and the first control section 54A at the first-space side determines the conditions in the first space SA on the basis of results of the image analysis processing and the audio analysis processing. However, the second control section MB at the second-space-SB side may perform the image analysis processing on the first picked-up image signal received from the first imaging unit 1A and the audio analysis processing on the first audio signal received from the first audio input unit 2A, and the first control section 54A at the first-space side may determine the conditions in the first space SA on the basis of the results of the image analysis processing and the audio analysis processing.

In this case, the second control section MB at the second-space-SB side sets the parameter related to the audio processing on the first audio signal performed by the first audio signal processing section 52A on the basis of a result of the determination of the conditions in the first space SA, and the first control section 54A at the first-space-SA side makes the first audio input unit 2A perform various kinds of processing on the basis of the parameter which is related to the audio processing of the first audio signal and which is received from the second control section MB.

This is similarly applicable to the second control section MB at the second-space-SB side in the embodiments.

Finally, advantageous effects described in the present disclosure are merely illustrative and are not limitative. Other advantageous effects may be accomplished, or only some of the advantageous effects described in the present disclosure may be accomplished.

In addition, the embodiments described in the present disclosure are merely illustrative, and the present invention is not limited to the foregoing embodiments. Hence, it should be understood that various changes can be made according to design or the like in addition to the foregoing embodiments without departing from the scope and spirit of the present invention. In addition, not all of combinations of configurations described in the embodiments are necessarily essential to address the technical problems.

REFERENCE SIGNS LIST

100: Virtual space connection device
1A: First imaging unit
1B: Second imaging unit
2A: First audio input unit
2B: Second audio input unit
3A: First display unit
3B: Second display unit
5A: First arithmetic processing unit
5B: Second arithmetic processing unit
SA: First space
SB: Second space

What is claimed is:

1. A system comprising:
a first imaging unit which comprises a first imaging lens, and which is provided in a first space that is a first indoor space;
a first microphone provided in the first space;
a first speaker provided in the first space;
a first screen provided on a wall surface of the first indoor space;
a first projector which is provided in the first space, and which outputs a projection image to the first screen; and
a first arithmetic processing unit that performs:
processing of transmitting, to a second-space side that is a second indoor space separated from the first space, a first picked-up image signal obtained by imaging the first space by the first imaging unit, and a first audio signal obtained by collecting sound in the first space by the first microphone; and
processing of receiving, from the second-space side, a second picked-up image signal obtained by imaging the second space, and a second audio signal obtained by collecting sound in the second space, causing the first projector to output, to the first screen, the projection image based on the second picked-up image signal, and causing the first speaker to output audio based on the second audio signal so as to virtually connect the second space to the first space, wherein the system performs:
first image analysis processing of detecting a person in the first space based on the first picked-up image signal;
first attenuation processing of performing attenuation processing on the first audio signal when no person is detected through the first image analysis processing; and
first directivity control processing of controlling a directivity of the first microphone so as to be directed to a position of the person in the first space detected through the first image analysis processing.

2. The system according to claim 1, wherein the first screen is provided with a hole that exposes the first imaging lens.

3. The system according to claim 1, further performing:
first audio analysis processing of detecting ambient sound in the first space; and
first attenuation control processing of performing attenuation processing on the first audio signal to a frequency band corresponding to the ambient sound in the first space.

4. The system according to claim 1, further performing first amplification control processing of performing amplification processing on the first audio signal when the person is detected through the first image analysis processing.

5. The system according to claim 4, detecting, through the first image analysis processing, the person having a face directed to the first screen.

6. The system according to claim 1, detecting, through the first image analysis processing, luminance in the first space, determining whether the first space is in a dark room state based on the luminance in the first space, and performing first attenuation processing of performing attenuation processing on the first audio signal when the first space is in the dark room state.

7. A virtual space connection device comprising:
a first imaging unit which comprises a first imaging lens, and which is provided in a first space that is a first indoor space;

a first microphone provided in the first space;
a first speaker provided in the first space;
a first screen provided on a wall surface of the first indoor space;
a first projector which is provided in the first space, and which outputs a projection image to the first screen;
a first arithmetic processing unit that performs:
  processing of transmitting, to a second-space side that is a second indoor space separated from the first space, a first picked-up image signal obtained by imaging the first space by the first imaging unit, and a first audio signal obtained by collecting sound in the first space by the first microphone; and
  processing of receiving a second picked-up image signal obtained by imaging the second space, and a second audio signal obtained by collecting sound in the second space, causing the first projector to output, to the first screen, the projection image based on the second picked-up image signal, and causing the first speaker to output audio based on the second audio signal so as to virtually connect the second space to the first space,
a second imaging unit which comprises a second imaging lens, and which is provided in the second space;
a second microphone provided in the second space;
a second speaker provided in the second space;
a second screen provided on a wall surface of the second indoor space;
a second projector which is provided in the second space, and which outputs, to the second screen, a projection image; and
a second arithmetic processing unit that performs:
  processing of transmitting, to the first-space side separated from the second space, the second picked-up image signal obtained by imaging the second space by the second imaging unit, and the second audio signal obtained by collecting sound in the second space by the second microphone; and
  processing of receiving the first picked-up image signal, and the first audio signal, causing the second projector to output, to the second screen, the projection image based on the first picked-up image signal, and causing the second speaker to output audio based on the first audio signal so as to virtually connect the first space to the second space,
wherein the virtual space connection device performs:
first image analysis processing of detecting a person in the first space based on the first picked-up image signal;
first attenuation processing of performing attenuation processing on the first audio signal when no person is detected through the first image analysis processing;
first directivity control processing of controlling a directivity of the first microphone so as to be directed to a position of the person in the first space detected through the first image analysis processing;
second image analysis processing of detecting a person in the second space based on the second picked-up image signal; and
second directivity control processing of controlling a directivity of the second microphone so as to be directed to a position of the person in the second space detected through the second image analysis processing.

* * * * *